US010634812B2

(12) United States Patent
Romano et al.

(10) Patent No.: US 10,634,812 B2
(45) Date of Patent: Apr. 28, 2020

(54) METHOD FOR OPERATING DEDICATED LIGHT EMITTER ELEMENTS TO A RESPECTIVE ONE LIGHT RECEIVER ELEMENT IN A LIGHT CURTAIN ARRANGEMENT AND LIGHT CURTAIN ARRANGEMENT

(71) Applicant: OMRON Corporation, Kyoto (JP)

(72) Inventors: Enzo Romano, Moncalieri Torino (IT); Paolo Viviani, Villastellone (IT); Maurizio Cambursano, Chivasso (IT); Pasqualino Brunetti, Turin (IT); Gianmarco Grange, Turin (IT); Keisaku Kikuchi, Kusatsu (JP); Satoru Shimokawa, Ostu (JP); Kazuhiro Kudo, Kusatsu (JP); Kazunori Osako, Otsu (JP)

(73) Assignee: OMRON Corporation, Kyoto (JP)

( * ) Notice: Subject to any disclaimer, the term of this patent is extended or adjusted under 35 U.S.C. 154(b) by 197 days.

(21) Appl. No.: 16/009,166

(22) Filed: Jun. 14, 2018

(65) Prior Publication Data

US 2019/0101668 A1     Apr. 4, 2019

(30) Foreign Application Priority Data

Sep. 29, 2017     (IT) .................. 102017000109596

(51) Int. Cl.
*G01V 8/20*     (2006.01)
*F16P 3/14*     (2006.01)

(52) U.S. Cl.
CPC ............... *G01V 8/20* (2013.01); *F16P 3/144* (2013.01)

(58) Field of Classification Search
CPC .................................. G01V 8/20; F16P 3/144
See application file for complete search history.

(56) References Cited

U.S. PATENT DOCUMENTS

| 5,220,177 A | 6/1993 | Harris |
| 2005/0133702 A1 | 6/2005 | Meyer |

(Continued)

FOREIGN PATENT DOCUMENTS

| CN | 103376475 | 10/2013 |
| CN | 105094005 | 11/2015 |

(Continued)

OTHER PUBLICATIONS

Office Action of Japan Counterpart Application, with English translation thereof, dated Jul. 9, 2019, pp. 1-8.

(Continued)

*Primary Examiner* — Que Tan Le
*Assistant Examiner* — Jennifer D Bennett
(74) *Attorney, Agent, or Firm* — JCIPRNET

(57) ABSTRACT

A method for operating a light curtain arrangement for monitoring a safety area is provided. The light curtain arrangement includes a plurality of first light emitter elements placed at an emitter side of the safety area, and a plurality of second light receiver elements placed at a receiver side of the safety area. The method includes the steps of: assigning a plurality of dedicated light emitter elements to a respective one light receiver element, wherein the assigned light emitter elements form an array; and activating the dedicated light emitter elements of a respective array to contemporaneously emit light, and at the same time, receiving the emitted light from the activated light emitter elements by the respective light receiver element.

20 Claims, 6 Drawing Sheets

(56) References Cited

U.S. PATENT DOCUMENTS

| | | | | |
|---|---|---|---|---|
| 2006/0001924 A1* | 1/2006 | Tatarczyk | ........... | B41F 33/0036 |
| | | | | 358/509 |
| 2012/0312956 A1* | 12/2012 | Chang | ..................... | G06F 3/017 |
| | | | | 250/201.1 |
| 2013/0214136 A1* | 8/2013 | Schoenleitner | .......... | G01V 8/20 |
| | | | | 250/222.1 |
| 2016/0327639 A1* | 11/2016 | Albert | ..................... | F16P 3/144 |

FOREIGN PATENT DOCUMENTS

| | | | |
|---|---|---|---|
| CN | 107078807 | | 8/2017 |
| EP | 2233932 A1 | * | 9/2010 |
| JP | H07253460 | | 10/1995 |
| JP | H08148981 | | 6/1996 |
| JP | 09270688 A | * | 10/1997 |
| JP | H09270688 | | 10/1997 |
| JP | H11173044 | | 6/1999 |
| JP | 11211843 A | * | 8/1999 |
| JP | H11211843 | | 8/1999 |
| JP | 2007158475 | | 6/2007 |
| JP | 2011215122 | | 10/2011 |
| KR | 101701419 | | 2/2017 |

OTHER PUBLICATIONS

"Search Report of European Counterpart Application," dated Jul. 9, 2018, p. 1-p. 8.

"Office Action of China Counterpart Application," with English translation thereof, dated Nov. 29, 2019, p. 1-p. 23.

"Search Report of Italy Counterpart Application," dated May 29, 2018, with English translation thereof, p. 1-p. 12.

* cited by examiner

METHOD FOR OPERATING DEDICATED LIGHT EMITTER ELEMENTS TO A RESPECTIVE ONE LIGHT RECEIVER ELEMENT IN A LIGHT CURTAIN ARRANGEMENT AND LIGHT CURTAIN ARRANGEMENT

CROSS-REFERENCE TO RELATED APPLICATION

This application claims the priority benefit of Italy Application no. 102017000109596, filed on Sep. 29, 2017. The entirety of the above-mentioned patent application is hereby incorporated by reference herein and made a part of this specification.

BACKGROUND

Technical Field

The disclosure relates to a method for operating a light curtain arrangement for monitoring a safety area and to a light curtain arrangement for monitoring a safety area.

Description of Related Art

A light curtain arrangement can be used for monitoring a safety area, in particular in order to detect a moving object in the safety area. The light curtain arrangement may include a plurality of light emitter elements located on an emitter side of the safety area and a plurality of light receiver elements placed at a receiver side of the safety area. Each light receiver element can be coupled to a specific light emitter element such as to detect light emitted from the specific light emitter element. If a light receiver element does not detect/receive any light from the specific light emitter element coupled thereto, the light curtain arrangement can determine that an object is present in the safety area and can for example emit an alarm.

For example, document US 2005/0133702 A1 shows a light curtain arrangement in which a plurality of light emitters are individually activated sequentially and/or cyclically.

It can be desirable to be able to detect objects over a greater distance. This may result in increasing a size of the safety area, in particular in increasing a distance between the light emitter elements and the light receiver elements.

SUMMARY

It is hence an object of the disclosure to provide an improved method for operating a light curtain arrangement and an improved light curtain arrangement.

According to a first aspect, a method for operating a light curtain arrangement for monitoring a safety area is provided. The light curtain arrangement includes a plurality of first light emitter elements placed at an emitter side of the safety area, wherein the light emitter elements are arranged in a fixed geometric pattern, and a plurality of second light receiver elements placed at a receiver side of the safety area, wherein the light receiver elements are arranged in a fixed geometric pattern, and wherein the emitter side and the receiver side are separated by a predetermined distance. The method includes the steps of: assigning a plurality of dedicated light emitter elements among the plurality of first of light emitter elements to a respective one light receiver element among the plurality of second light receiver elements, wherein the assigned light emitter elements form an array; and activating the dedicated light emitter elements of a respective array to contemporaneously emit light, and at the same time, receiving the emitted light from the activated light emitter elements by the respective light receiver element.

According to a second aspect, a light curtain arrangement for monitoring a safety area is provided. The light curtain arrangement includes: a plurality of first light emitter elements placed at an emitter side of the safety area, wherein the light emitter elements are arranged in a fixed geometric pattern; and a plurality of second light receiver elements placed at a receiver side of the safety area, wherein the light receiver elements are arranged in a fixed geometric pattern; wherein the emitter side and the receiver side are separated by a predetermined distance; and wherein to each of the plurality of second light receiver elements a plurality of dedicated light emitter elements among the plurality of first light emitter elements is assigned, the assigned light emitter elements forming an array, wherein the dedicated light emitter elements are implemented to contemporaneously emit light to be received by the respective light receiver element.

In embodiments, the light curtain arrangement according to the second aspect is configured to be operated according to the method of the first aspect.

In particular, the safety area is an area that can be monitored by the light curtain arrangement. For example, the light curtain arrangement can detect movements and/or the presence of objects within the safety area. The safety area may be an area of space extending between the emitter side and the receiver side. In particular, the safety area is an area that can be reached by the light emitted by the light emitter elements.

The light emitter elements may include light-emitter diodes (LED). Additionally, each light emitter element may include an optical emitter lens. In particular, each diode can be located in the focal plane of a corresponding emitter lens. The plurality of light emitter elements may be fixed on an electronic board, for example by soldering. The light emitter elements are arranged in a fixed geometric pattern, for example in a line, in two parallel lines, in a rectangle or the like. In particular, the light emitter elements are not displaceable such that the geometric pattern is not modifiable.

The light receiver elements may include optical sensors, for example photoreceivers. Additionally, each light receiver element may include an optical receiver lens. The optical receiver lens can be of the same type as the optical emitter lens. Each optical receiver lens may be placed in the focal plane of a corresponding optical sensor, in particular such as to focus light received from a light emitter element onto an active surface of the light receiver element.

The light receiver elements are arranged in a fixed geometric pattern, for example in a line, in two parallel lines, in a rectangle or the like. In particular, the light receiver elements are not displaceable such that the geometric pattern is not modifiable. The geometric pattern into which the light receiver elements are arranged can be the same as the geometric pattern into which the light emitter elements are arranged. Alternatively, these geometric patterns may be different. The number of light receiver elements may be the same as the number of light emitter elements.

The emitter side and the receiver side are separated by a predetermined distance. For example, the emitter side is a plane in which the light emitter elements are arranged and the receiver side is a plane in which the light receiver elements are arranged. The plane including the light emitter elements may be parallel to the plane including the light receiver elements.

A plurality of dedicated light emitter elements may be assigned to a respective one light receiver element as an array. In particular, several light emitter elements are selected out of the plurality of light emitter elements as dedicated light emitter elements and are assigned to a single respective light receiver element. In embodiments, a plurality of dedicated light emitter elements are assigned to each of the plurality of light receiver elements such that each light receiver element has an array assigned thereto. The step of assigning the plurality of dedicated light emitter elements to the respective one light receiver element may be part of a step of setting up the light curtain arrangement prior to use.

The dedicated light emitter elements may contemporaneously or simultaneously emit light such that the respective light receiver element to which the dedicated light emitter elements are assigned receives the light emitted by the dedicated light emitter elements at once, in particular at the same time. In particular, a respective light receiver element can receive light from a plurality of dedicated light emitter elements at once.

The light emitted from the dedicated light emitter elements may overlap such that the respective light receiver element receives/detects a light beam corresponding to an overlap of the light beams respectively emitted from the dedicated light emitter elements. The power density of the light beam received by the respective light receiver element may be higher than the power density of a single light beam emitted by a single light emitter element. For example, for a number N of dedicated light emitter elements emitting light at a same luminous power, the luminous power of the light beam received by the respective light receiver element can be up to N times as high as the luminous power of a single dedicated light emitter element. Since N light emitter elements are assigned to a single light receiver element, one can speak of an "N to 1 multibeam configuration" of the light curtain arrangement.

If a single light beam is emitted by a single light emitter element, a luminous power of a light beam reaching one of the light receiver elements may be very weak in case that the predetermined distance is large. The luminous power of the superimposed/overlapping light beam emitted by the dedicated light emitter elements may be greater than a range of a single light beam emitted by a single light emitter element.

In particular, when light is emitted simultaneously by the dedicated light emitter elements, the predetermined distance between the emitter side and the receiver side can be increased as compared to a case in which the light is emitted by only one light emitter element. The light curtain arrangement may reach high operating distances, in particular using small diameter emitting lenses.

Theoretically, the operating distance $d\_N$ which it is possible to reach with N light emitter elements activated simultaneously is $d\_N = d*sqrt(N)$, wherein d is the operating distance reachable with a single light emitter element. For example, the predetermined distance may be up to 90 m.

In particular, a range efficiently covered by the light emitted by the light emitter elements is increased and a larger safety area may be monitored using the light curtain arrangement according to the second aspect.

The embodiments, features and advantages described with reference to the light curtain arrangement according to the second aspect apply mutatis mutandis to the method for operating a light curtain arrangement according to the first aspect.

According to an embodiment, the method according to the first aspect further includes: sequentially activating pairs of light receiver elements and light emitter arrays for detecting an object located in the safety area, wherein a pair includes the dedicated light emitter elements assigned to the respective one light receiver element and the respective one light receiver element.

The pair may include the plurality of dedicated light emitter elements assigned to the respective one light receiver element on one hand, and the respective one light receiver element on the other hand. In particular, the pair includes at least two dedicated light emitter elements and at least the respective light receiver element.

The word "sequentially" may here be understood as "one after another". In particular, all the dedicated light emitter elements assigned to a first respective light receiver element are activated or turned on at a same first time. Then, at a second time later than the first time, all the dedicated light emitter elements assigned to a second respective light receiver element may be activated or turned on. In particular, the arrays of light receiver elements are activated sequentially or cyclically in order to scan the entire safety area.

According to a further embodiment, only one respective light receiver element and the dedicated light emitter elements assigned to the one respective light receiver element are activated at a time.

In particular, each array of dedicated light emitter elements can be turned on individually, wherein the array may be turned on one after another. For example, when the dedicated light emitter elements assigned to the second respective light receiver element are activated at the second time, all the dedicated light emitter elements assigned to the first respective light receiver element may be turned off. In particular, the dedicated light emitter elements assigned to the first respective light receiver element are never activated at the same time as the dedicated light emitter elements assigned to the second respective light receiver element.

According to a further embodiment, assigning a plurality of dedicated light emitter elements to a respective light receiver element includes: determining the predetermined distance; and determining a number of light emitter elements to be assigned to each light receiver element according to of the predetermined distance.

In particular, the number of light emitter elements to be assigned to each light receiver element is chosen such that the overlapping light beams from the dedicated light emitter elements reach the respective light receiver element. For example, the determined number of light emitter elements to be assigned to each light receiver element increases with an increasing predetermined distance.

According to a further embodiment, the method according to the first aspect further includes: for each light receiver element, selecting only one light emitter element of the dedicated light emitter elements assigned to the respective light receiver element, and deactivating the other dedicated light emitter elements forming the respective array, if the predetermined distance is lower than a predetermined threshold distance.

In particular, the light curtain arrangement may be operated in at least two modes. If the predetermined distance is rather large, in particular greater than the predetermined threshold distance, the light curtain arrangement may be operated in a first operation mode in which a plurality of dedicated light emitter elements assigned to a respective one light receiver element are activated at once. For example, the predetermined threshold distance is 10 m.

If the predetermined distance is rather small, in particular lower than the predetermined threshold distance, the light curtain arrangement may be operated in a second operation mode in which only one light emitter element is activated at once. In the second operation mode, all dedicated light emitter elements forming the array may be deactivated except for the selected one.

The light curtain arrangement may be operated in the first and the second operation mode, without having to modify the arrangement of the light emitter elements and/or light receiver elements. The light curtain arrangement may determine whether to operate in the first or second operation mode based on a measured or determined predetermined distance. In particular, a same light curtain arrangement can be used for small and large predetermined distances and may be used flexibly. For example, the installation of the light curtain arrangement is very simple because it does not vary from user to user. Further, a same design of a light curtain arrangement may be used for various applications, which is beneficial in terms of costs.

According to a further embodiment, the number of light receiver elements is less than the number of light emitter elements. For example, if N light emitter elements are respectively assigned to each light receiver element, there may be N times less light receiver elements than light emitter elements.

According to a further embodiment, the light emitter elements and/or the light receiver elements are arranged along a line. In embodiments, the light emitter elements assigned to a light receiver element are located symmetrically around the light receiver element.

According to a further embodiment, the light emitter elements are implemented to emit light in a same principal direction from the emitter side of the safety area towards the receiver side of the safety area.

A main direction into which the light emitter elements emit light can be identical for all light emitter elements, in particular for light emitter elements of a same array.

According to a further embodiment, an array includes a predetermined number N of dedicated light emitter elements assigned to a respective one light receiver element, the assigned light emitter elements being the N light emitter elements that are located geometrically closest to the respective one light receiver element.

By assigning the N light emitter elements that are closest to the respective one light receiver element, it can be made sure that the light emitted by the N light emitter elements actually reaches the respective one light receiver element. Additionally, the predetermined distance may be further increased.

According to a further embodiment, the light emitter elements of a respective one array are arranged next to each other. In particular, the array includes neighboring light emitter elements.

According to a further embodiment, all light emitter elements have the same nominal luminous power.

According to a further embodiment, the light curtain arrangement is implemented to operate in the first operation mode to detect an object in a safety area extending along a first predetermined distance, and to operate in the second operation mode to detect an object in a safety area extending along a second predetermined distance, the first predetermined distance being larger than the second predetermined distance, wherein the first operation mode includes, for each light receiver element, contemporaneously emitting light from the dedicated light emitter elements assigned to a respective one light receiver element towards the respective one light receiver element; and wherein the second operation mode includes, for each light receiver element, emitting light from one selected light emitter element to a respective one light receiver element, wherein the one selected light emitter element is the light emitter element that is located geometrically closest to the respective one light receiver element.

The distance covered by the light emitted by the dedicated light emitter elements in the first operation mode may be larger than the distance covered by the light emitted by the single active light emitter element in the second operation mode. In particular, operating the light curtain arrangement in the first operation mode may be advantageous if the predetermined distance is larger than the predetermined threshold distance, for example for the first predetermined distance, because the safety area extending along the large first predetermined distance can be monitored. Operating the light curtain arrangement in the second operation mode may be advantageous if the predetermined distance is smaller than the predetermined threshold distance, for example for the second predetermined distance, because less energy is consumed when only a single light emitter element is used.

In embodiments, it is possible to vary the supply current to the light emitter elements to increase or decrease the distance covered by emitted light. The energy consumption of the light curtain arrangement may be optimized in view of the predetermined distance.

According to a further embodiment, the light curtain arrangement further includes a configuration device for setting the operation mode, wherein the configuration device includes at least one of the group of: a dip switch device, a configuration memory device, and a programming interface.

Setting the operation mode may correspond to choosing whether the light curtain arrangement is to be operated in the first or second operation mode. The configuration device may be used to set up the light curtain arrangement. In particular, the configuration device is operated by a user of the light curtain arrangement.

In embodiments, the light curtain arrangement may be operated in other operation modes than the first and second operation modes, for example in an intermediate operation mode. In the intermediate operation mode, several light emitter elements from each array are activated at once, without activating all of the light emitter elements of the array. This intermediate operation mode may be useful for intermediate predetermined distances. In particular, it is also possible to operate the light curtain arrangement in several different operation modes, thereby setting an operation range of the light curtain arrangement. The respective operating modes may for example be set using the configuration device.

According to a further embodiment, a number of light emitter elements assigned to each light receiver element is set by the configuration device. In particular, a user may set the number of light emitter elements assigned to each light receiver element using the configuration device, in accordance with the predetermined distance.

According to a further embodiment, in the second operation mode, a supply current value for the light emitter elements is reduced with respect to the first operation mode. The energy consumed when the light curtain arrangement is operated in the second operation mode is smaller than the energy consumed when it is operated in the first operation mode.

According to a further embodiment, the light curtain arrangement of the second aspect further includes a control device implemented to activate and deactivate the light emitter elements and the light receiver elements according to the method of the first aspect.

According to a further aspect, the disclosure relates to a computer program product including a program code for executing the above-described method for operating a light curtain arrangement according to the first aspect when run on at least one computer.

A computer program product, such as a computer program means, may be embodied as a memory card, USB stick, CD-ROM, DVD or as a file which may be downloaded from a server in a network. For example, such a file may be provided by transferring the file including the computer program product from a wireless communication network.

Further possible implementations or alternative solutions of the invention also encompass combinations—that are not explicitly mentioned herein—of features described above or below with regard to the light curtain arrangement and the method for operating the light curtain arrangement. The person skilled in the art may also add individual or isolated aspects and features to the most basic form of the light curtain arrangement and the method for operating the light curtain arrangement.

BRIEF DESCRIPTION OF THE DRAWINGS

Further embodiments, features and advantages of the light curtain arrangement and the method for operating the light curtain arrangement will become apparent from the subsequent description and dependent claims, taken in conjunction with the accompanying drawings.

DESCRIPTION OF THE EMBODIMENTS

Figure 1:
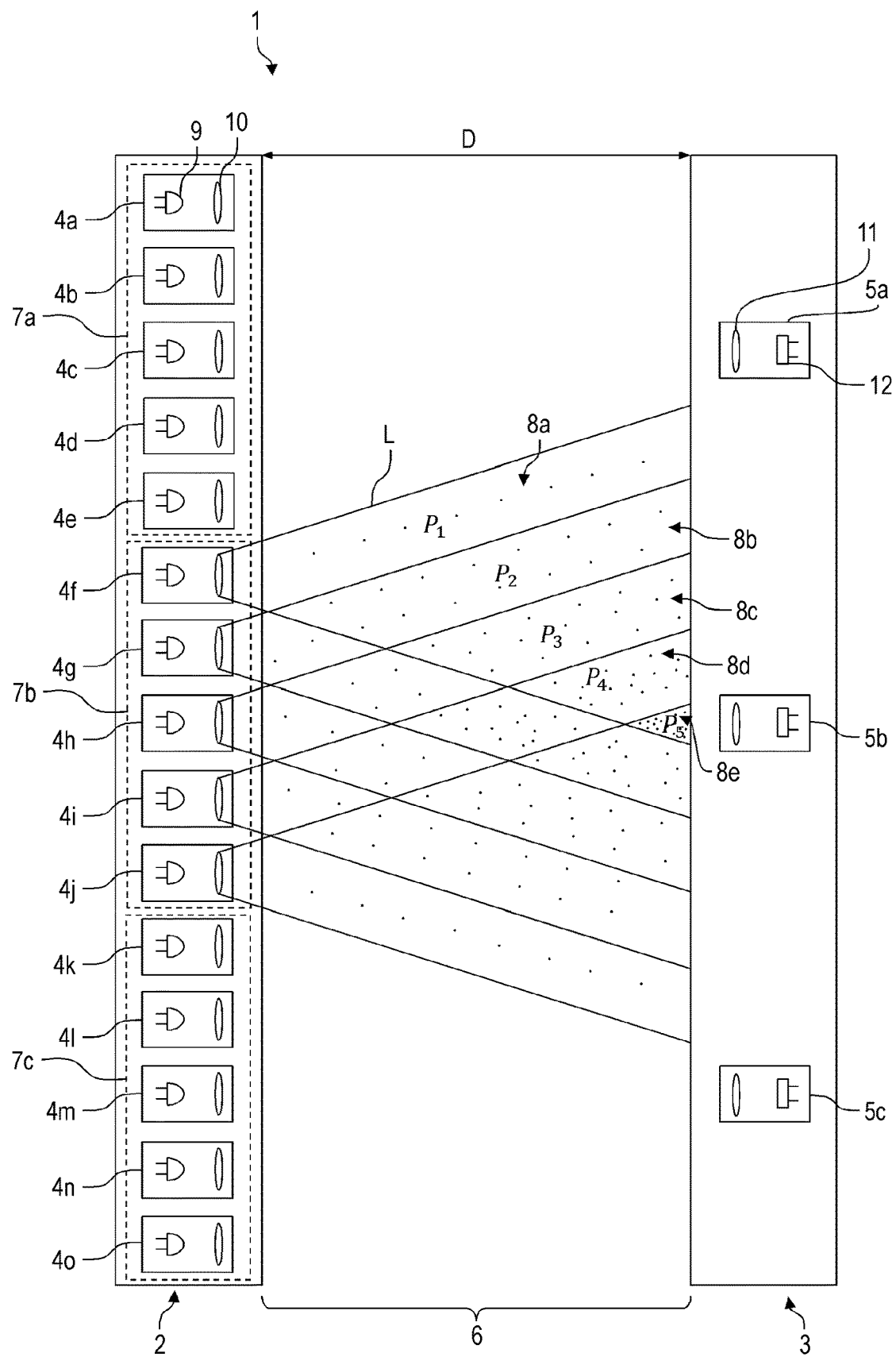
FIG. 1 shows a light curtain arrangement according to a first embodiment.

In the Figures, like reference numerals designate like or functionally equivalent elements, unless otherwise indicated.

FIG. 1 shows a light curtain arrangement 1 according to a first embodiment. The light curtain arrangement 1 can be used to detect objects in a safety area 6, thereby monitoring the safety area 6.

The light curtain arrangement 1 includes a plurality of first light emitter elements 4a-4o arranged at an emitter side 2 of the safety area 6. The light emitter elements 4a-4o are arranged along a line. Each light emitter element 4a-4o includes a LED 9 and an emitter lens 10. Each LED 9 is in the focal plane of the corresponding lens 10. In FIG. 1, only the LED 9 and the emitter lens 10 of the light emitter element 4a are provided with reference signs, but the remaining light emitter elements 4b-4o are identical. All the light emitter elements 4a-4o have a same nominal luminous power and are arranged such as to emit light along a same direction, namely towards a receiver side 3 of the safety area 6. The light emitter elements 4a-4o are held by a mechanical holder, here an electronic board.

The light curtain arrangement 1 further includes a plurality of second light receiver elements 5a-5c arranged along a line on the receiver side 3 of the safety area 6. A distance between the emitter side 2 and the receiver side 3 is given by a predetermined distance D. Each light receiver element 5a-5c includes a receiver lens 11 and a photoreceiver 12. Each lens 11 focusses the received light onto an active surface of the photoreceiver 12. In FIG. 1, only the receiver lens 11 and the photoreceiver 12 of the light receiver element 5a are provided with reference signs, but the remaining light receiver elements 5b, 5c are identical.

Figure 2:
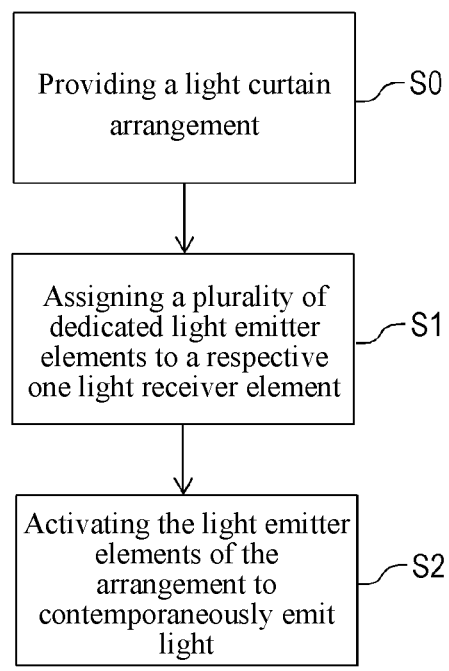
FIG. 2 shows a method for operating a light curtain arrangement according to a first embodiment.

The light curtain arrangement 1 of FIG. 1 can be operated according to the method for operating a light curtain arrangement 1 according to a first embodiment shown in FIG. 2. In the following, the operation of the light curtain arrangement 1 will be described in view of FIGS. 1 and 2.

In an initializing step S0, the light curtain arrangement 1 shown in FIG. 1 is provided. In a step S1, a plurality of dedicated light emitter elements 4a-4o are assigned to a respective one light receiver element 5a-5c. Namely, the five light emitter elements 4a-4o closest to each light receiver element 5a-5c are assigned thereto. This is, the neighboring light emitter elements 4a-4e are assigned to the light receiver element 5a, the neighboring light emitter elements 4f-4j are assigned to the light receiver element 5b, and the neighboring light emitter elements 4k-4o are assigned to the light receiver element 5c. The light emitter elements 4a-4e form an array 7a, the light emitter elements 4f-4j form an array 7b, and the light emitter elements 4k-4o form an array 7c.

In a step S2, the light emitter elements 4a-4o of an array 7a-7c are activated to contemporaneously emit light L. In FIG. 1, all the light emitter elements 4f-4j of the array 7b are simultaneously activated such that the light receiver element 5b receives the emitted light from the activated light emitter elements 4f-4j at a same time.

As shown in FIG. 1, each activated light emitter element 4f-4j emits light with a luminous power $P_1$ towards the receiver side 3 along a cone. Since the light emitter elements 4f-4j are arranged next to each other, the luminous power of the light emitted by each of the light emitter elements 4f-4j superimposes/overlaps. Namely, in a region 8a in which no light beams are superimposed, the light has a luminous power of $P_1$. In a region 8b in which two light beams are superimposed, the light has a luminous power of $P_2$, which is twice $P_1$. In a region 8c in which three light beams are superimposed, the light has a luminous power of $P_3$, which is three times $P_1$. In a region 8d in which four light beams are superimposed, the light has a luminous power of $P_4$, which is four times $P_1$. Finally, in a region 8e in which the five light beams are superimposed, the light has a luminous power of $P_5$, which is five times $P_1$.

As can be seen in FIG. 1, the light receiver element 5b receives light with a luminous power of $P_5$. The luminous power $P_5$ of the light received at the light receiver element 5b is four times higher than a light emitted from only one light emitter element 4a-4o would be.

Advantageously, the light curtain arrangement 1 can be used to monitor a large safety area 6 because the light received by the light receiver element 5b has high luminous power $P_5$. Thus, the distance D can be large.

Figure 3A:
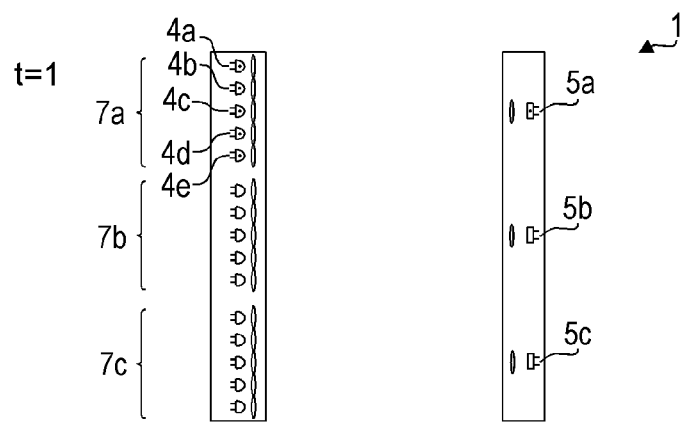
FIG. 3A, FIG. 3B and FIG. 3C show the light curtain arrangement according to the first embodiment being operated in a first operation mode.
Figure 3B:
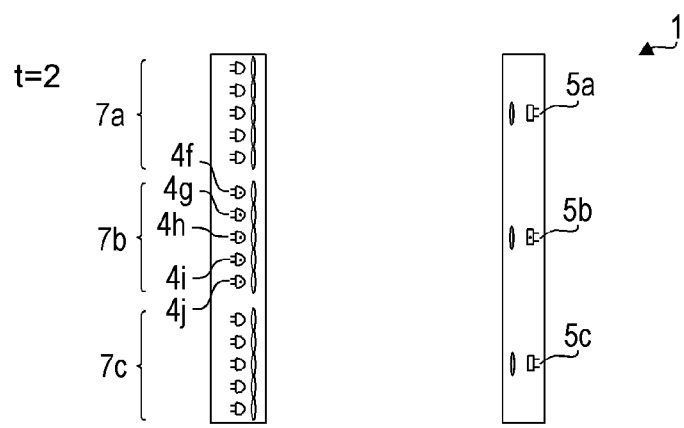
Figure 3C:
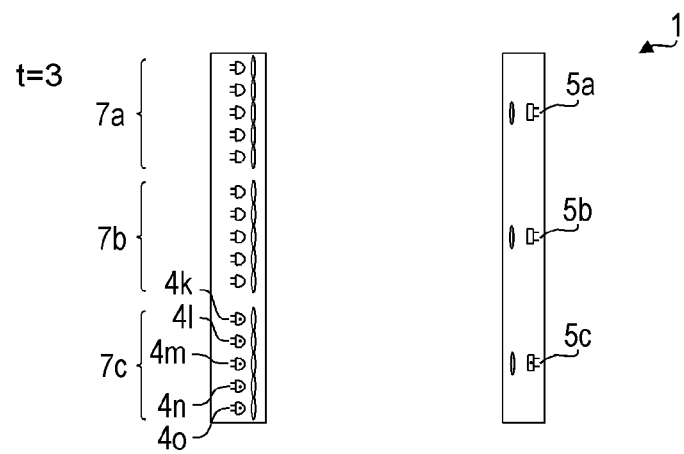

Instead of activating the light emitter elements 4f-4j of the array 7b, it is possible to activate only the light emitter elements 4a-4e of the array 7a or the light emitter elements 4k-4o of the array 7c. This is shown in FIG. 3A, FIG. 3B and FIG. 3C, which shows the light curtain arrangement 1 according to the first embodiment being operated in a first operation mode.

The first operation mode is characterized in that all light emitter elements 4a-4o of an array 7a-7c are activated at once, as described in conjunction with step S2 above. FIG. 3A, FIG. 3B and FIG. 3C show how pairs including a light emitter elements 4a-4o of an array 7a-7c and the corresponding light receiver element 5a-5c are activated sequentially. In FIG. 3A, FIG. 3B and FIG. 3C, the activated light emitter elements 4a-4o and the light receiver elements 5a-5c are indicated by a dot.

Namely, at a time t=1, only the light emitter elements 4a-4e forming the array 7a and the corresponding light receiver element 5a are activated. In FIG. 3A, FIG. 3B and FIG. 3C, the light cones emitted from the respective light emitter elements 4a-4o are not shown, but it is understood that their shape and power distributions are identical to those shown in FIG. 1.

Then, at a time t=2 later than the time t=1, only the light emitter elements 4f-4j forming the array 7b and the corresponding light receiver element 5b are activated. The light emitter elements 4a-4e and the light receiver element 5a that were activated at time t=1 are deactivated at time t=2.

Then, at a time t=3 later than the time t=2, only the light emitter elements 4k-4o forming the array 7c and the corresponding light receiver element 5c are activated. The light emitter elements 4f-4j and the light receiver element 5b that were activated at time t=2 are deactivated at time t=3.

After performing the scanning as shown at time t=3, the light curtain arrangement 1 goes back to time t=1 and cyclically repeats the sequence t=1, t=2 and t=3. Thereby, the safety area 6 is scanned and an object placed in the safety area 6 can be detected.

Figure 6:
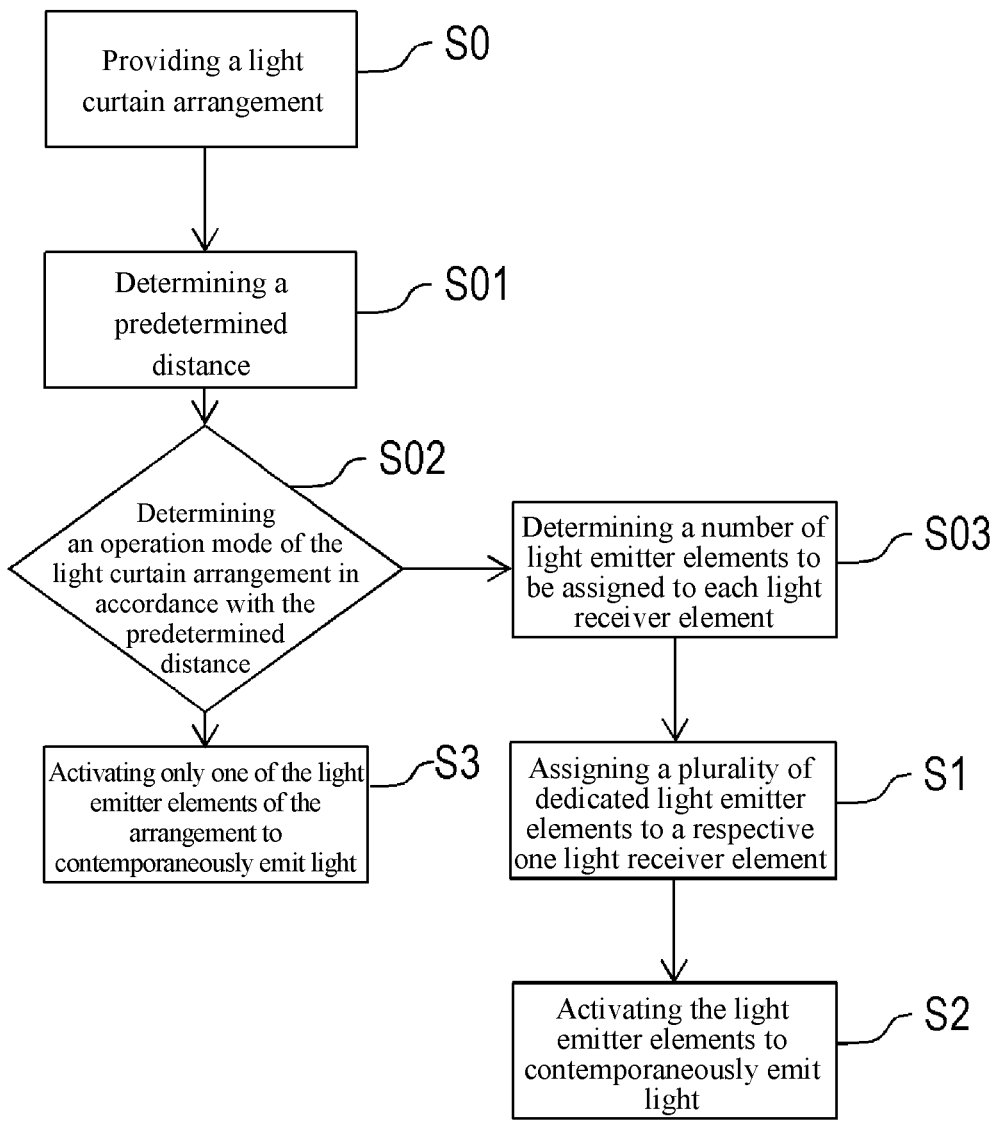
FIG. 6 shows a method for operating a light curtain arrangement according to a second embodiment.

The light curtain arrangement 1 can also be operated according to the method for operating a light curtain arrangement 1 according to a second embodiment shown in FIG. 6. The method according to the second embodiment is based on the method according to the first embodiment, with the steps S0, S1 and S2 being identical to those steps already described in view of FIG. 2. In the following, only the additional steps will be described.

In a step S01, the predetermined distance D is determined. A user can measure the predetermined distance D. In a step S02, the operation mode of the light curtain arrangement 1 is determined. Namely, it is determined whether the light curtain arrangement 1 is to be operated in the first operation mode described above in view of FIG. 3A, FIG. 3B and FIG. 3C or in the second operation mode to be described below in view of FIG. 4A, FIG. 4B and FIG. 4C.

To determine and set the operation mode, the light curtain arrangement 1 includes a configuration device (not shown). The configuration device includes a dip switch for choosing the operation mode, a configuration memory device for storing at least a predetermined threshold distance, and a programming interface.

In step S02, the operation mode is determined in accordance with the predetermined distance D. Namely, the predetermined distance D determined in step S01 is compared to the predetermined threshold distance stored in the configuration memory device.

If the predetermined distance D is greater than the predetermined threshold distance, it is determined that the light curtain arrangement 1 is to be operated in the first operation mode. In this case, in a step S03, the light curtain arrangement 1 determines a number of light emitter elements 4a-4o to be assigned to each light receiver element 5a-5c. In the embodiment of FIG. 1, the number of light emitter elements 4a-4o to be assigned to each light receiver element 5a-5c is five. Then, the light curtain arrangement 1 is operated in the first operation mode by performing the steps S1 and S2 already described above.

If however the predetermined distance D is smaller than the predetermined threshold distance, it is determined in step S02 that the light curtain arrangement 1 is to be operated in the second operation mode. In this case, the light curtain arrangement 1 is operated in the second operation mode by activating only one of the light emitter elements 4a-4o of an array 7a-7c in a step S3.

Figure 4A:
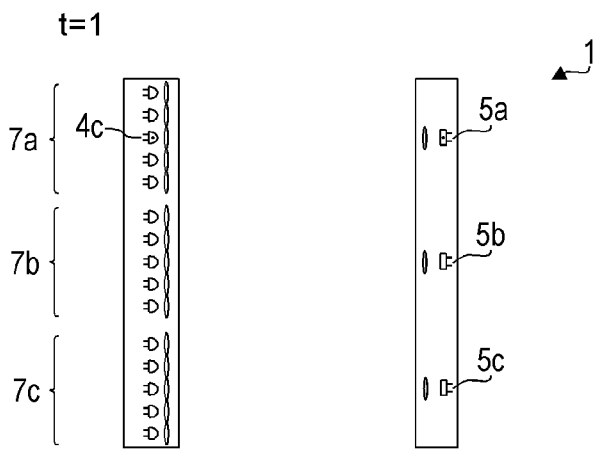
FIG. 4A, FIG. 4B and FIG. 4C show the light curtain arrangement according to the first embodiment being operated in a second operation mode.
Figure 4B:
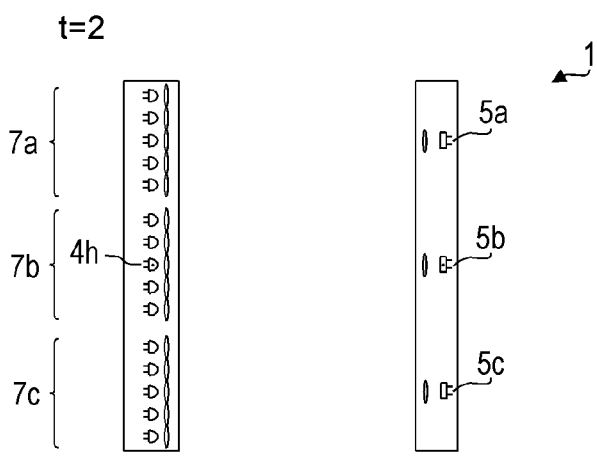
Figure 4C:
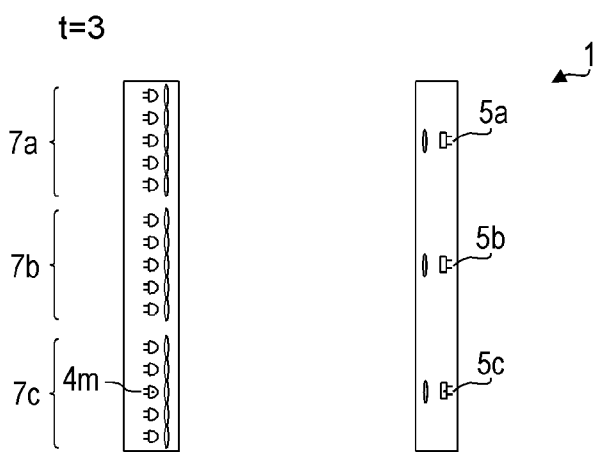

The second operation mode is described in view of FIG. 4A, FIG. 4B and FIG. 4C, which shows the light curtain arrangement 1 according to the first embodiment being operated in the second operation mode.

The second operation mode is characterized in that only one light emitter element 4a-4o from each array 7a-7c is activated at a time. Namely, the light emitter element 4a-4o from each array 7a-7c that is closest to the respective light receiver element 5a-5c is activated. This corresponds to activating the light emitter elements 4c, 4h and 4m, as shown in FIG. 4A, FIG. 4B and FIG. 4C. In FIG. 4A, FIG. 4B and FIG. 4C, the activated light emitter elements 4a-4o and the light receiver elements 5a-5c are indicated by a dot.

At a time t=1 shown in FIG. 4A, FIG. 4B and FIG. 4C, out of all the light emitter elements 4a-4c, only the light emitter element 4c is activated. Correspondingly, the light receiver element 5b is activated as well.

Then, at a time t=2 later than the time t=1, only the light emitter elements 4h and the corresponding light receiver element 5b are activated. The light emitter element 4c and the light receiver element 5a that were activated at time t=1 are deactivated at time t=2.

Then, at a time t=3 later than the time t=2, only the light emitter element 4m and the corresponding light receiver element 5c are activated. The light emitter element 4h and the light receiver element 5b that were activated at time t=2 are deactivated at time t=3.

After performing the scanning shown at time t=3, the light curtain arrangement 1 goes back to time t=1 and cyclically repeats the sequence t=1, t=2 and t=3. Thereby, the safety area 6 is scanned and an object placed in the safety area 6 can be detected.

Figure 5:
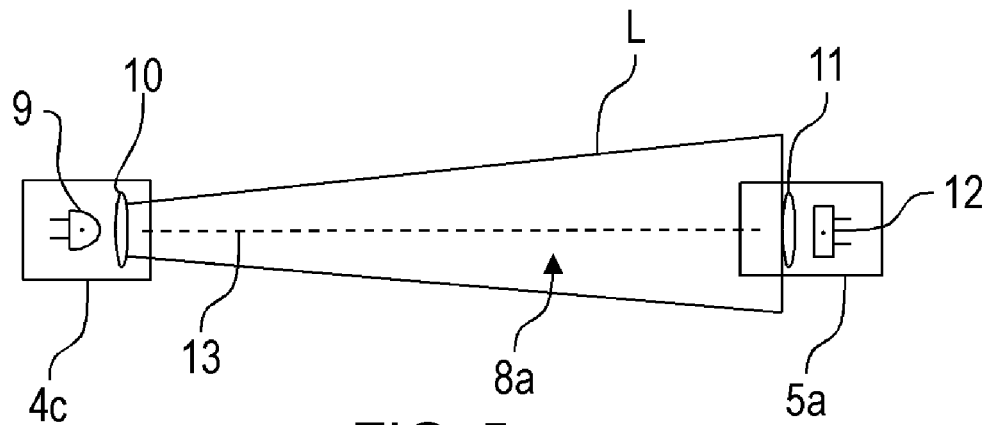
FIG. 5 shows an example of a light emitting element emitting light.

The light emitted by the light emitter elements 4c, 4h and 4m is not shown in FIG. 4A, FIG. 4B and FIG. 4C; however it is emitted as shown in FIG. 5. FIG. 5 shows an example of how the light emitter element 4c emits light L to the light receiver element 5a. It is understood that the light emission of the light emitter elements 4h and 4m to the light receiver elements 5b and 5c respectively is identical.

As shown in FIG. 5, the light L is emitted from the light emitter element 4c at the luminous power $P_1$ along a conical shape centered on a symmetry axis 13. The light receiver element 5a receives the light at the same luminous power $P_1$. Since no neighboring light emitter elements 4a-4o are activated simultaneously in the second operation mode, no addition of luminous power occurs. Thus, the light curtain arrangement 1 can only be operated in the second operation mode when the predetermined distance D is comparatively small.

In embodiments, if the predetermined distance D is determined to have an intermediate value, an intermediate number of light emitter elements 4a-4o of a same array 7a-7c can be activated at once. For example, the three light emitter elements 4g, 4h and 4i may be activated simultaneously, so that the corresponding light receiver element 5*b* receives a light with luminous power $P_3$.

Figure 7:
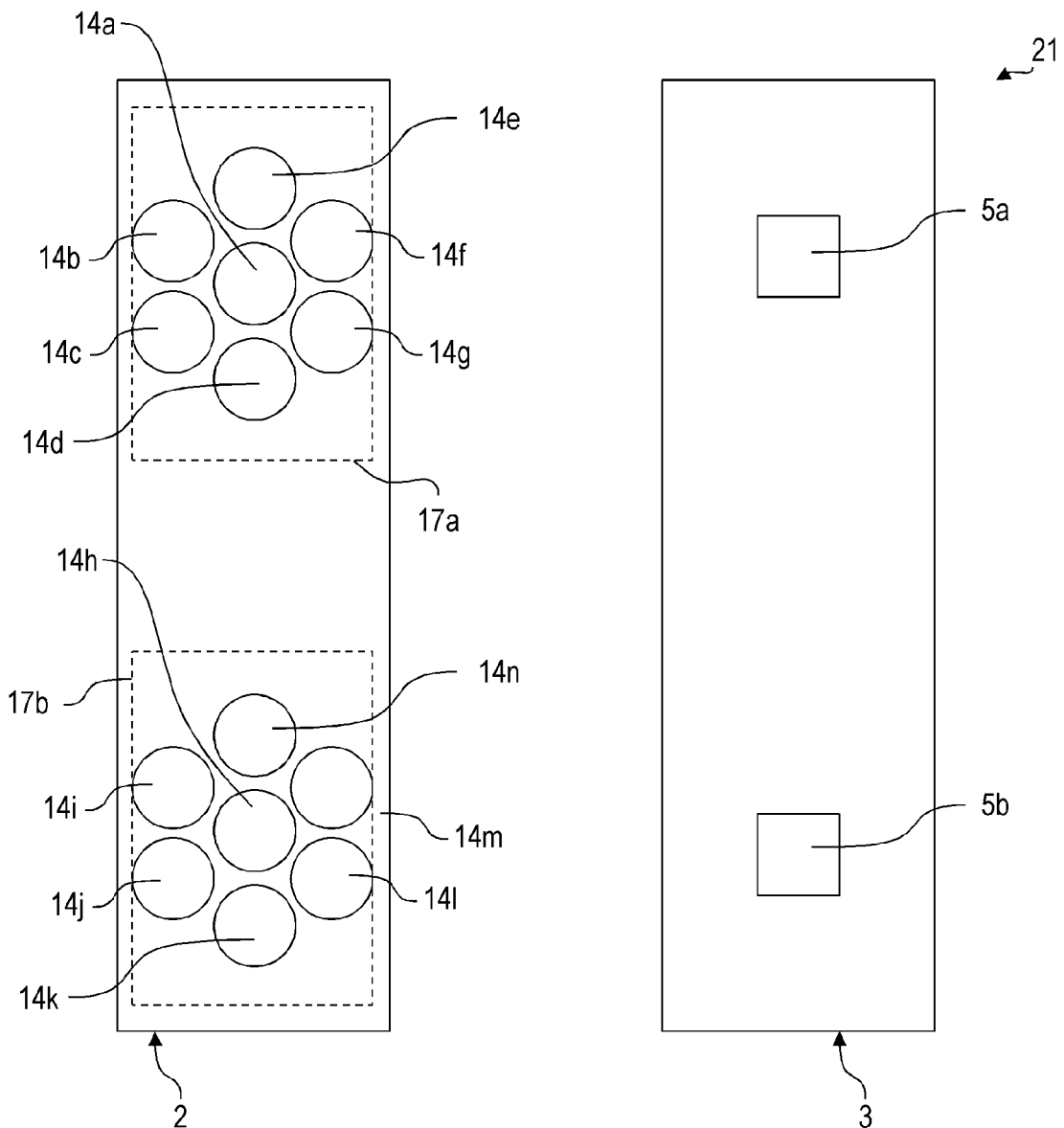
FIG. 7 shows a light curtain arrangement according to a second embodiment.

FIG. 7 shows a light curtain arrangement 21 according to a second embodiment. The light curtain arrangement 21 includes light emitter elements 14*a*-14*n* that are arranged differently from the light emitter elements 4*a*-4*o* of the light curtain arrangement 1 of the first embodiment. As shown in FIG. 7, the light emitter elements 14*a*-14*n* form two arrays 17*a* and 17*b*, respectively assigned to the light receiver elements 5*a* and 5*b*. The geometrical pattern in which the light emitter elements 14*a*-14*n* are arranged is no longer a line as in the first embodiment. Rather, the light emitter elements 14*a*-14*g* and the light emitter elements 14*h*-14*n* are respectively arranged in a circular geometry, with a light emitter element 14*a*, 14*h* being at the center of the circle, as shown in FIG. 7. In FIG. 7, the central light emitter elements 14*f* and 14*l* are the light emitter elements 14*a*-14*n* respectively closest to the light receiver elements 5*a* and 5*b*.

Although the invention has been described in accordance with preferred embodiments, it is obvious for the person skilled in the art that modifications are possible in all embodiments. For example, there may be more or less light emitter elements 4*a*-4*o* in one array 7*a*-7*c*. The total number of light emitter elements 4*a*-4*o*, of light receiver elements 5*a*-5*c* and/or of array 7*a*-7*c* may also vary. The geometric pattern of the light emitter elements 4*a*-4*o* and/or of the light receiver elements 5*a*-5*c* can be modified, for example such as to form rectangles. The light emitter elements 4*a*-4*o* must not be LEDs 9 with lenses 10, rather, they could also be lightbulbs or any type of light emitters complying with the safety standards. Similarly, any type of light detector complying with the safety standards can be used as the light receiver elements 5*a*-5*c*. The predetermined distance may vary arbitrarily. Furthermore, the light emitter elements 4*a*-4*o* assigned to a light receiver elements 5*a*-5*c* are not necessarily arranged symmetrically around the light receiver element 5*a*-5*c*. Moreover, the nominal luminous power of the different light emitter elements 4*a*-4*o* are not necessarily the same.

What is claimed is:

1. A method for operating a light curtain arrangement for monitoring a safety area, the light curtain arrangement comprising a plurality of first light emitter elements placed at an emitter side of the safety area, wherein the light emitter elements are arranged in a fixed geometric pattern, and a plurality of second light receiver elements placed at a receiver side of the safety area, wherein the light receiver elements are arranged in a fixed geometric pattern, and wherein the emitter side and the receiver side are separated by a predetermined distance, the method comprising the steps of:
   assigning a plurality of dedicated light emitter elements among the plurality of first of light emitter elements to a respective one light receiver element among the plurality of second light receiver elements, wherein the assigned light emitter elements form an array; and
   activating the dedicated light emitter elements of a respective array to contemporaneously emit light, and at the same time, receiving the emitted light from the activated light emitter elements by the respective light receiver element.

2. The method of claim 1, further comprising: sequentially activating pairs of light receiver elements and light emitter arrays for detecting an object located in the safety area, wherein a pair includes the dedicated light emitter elements assigned to the respective one light receiver element and the respective one light receiver element.

3. The method of claim 1, wherein only one respective light receiver element and the dedicated light emitter elements assigned to said one respective light receiver element are activated at a time.

4. The method of claim 1, wherein assigning a plurality of dedicated light emitter elements to a respective light receiver element comprises:
   determining the predetermined distance; and
   determining a number of light emitter elements to be assigned to each light receiver element according to the predetermined distance.

5. The method of claim 4, comprising:
   for each light receiver element, selecting only one light emitter element of the dedicated light emitter elements assigned to the respective light receiver element, and deactivating the other dedicated light emitter elements forming the respective array, if the predetermined distance is lower than a predetermined threshold distance.

6. The method of claim 2 wherein only one respective light receiver element and the dedicated light emitter elements assigned to said one respective light receiver element are activated at a time.

7. The method of claim 2, wherein assigning a plurality of dedicated light emitter elements to a respective light receiver element comprises:
   determining the predetermined distance; and
   determining a number of light emitter elements to be assigned to each light receiver element according to of the predetermined distance.

8. The method of claim 3, wherein assigning a plurality of dedicated light emitter elements to a respective light receiver element comprises:
   determining the predetermined distance; and
   determining a number of light emitter elements to be assigned to each light receiver element according to of the predetermined distance.

9. A light curtain arrangement for monitoring a safety area comprising:
   a plurality of first light emitter elements placed at an emitter side of the safety area, wherein the light emitter elements are arranged in a fixed geometric pattern; and
   a plurality of second light receiver elements placed at a receiver side of the safety area, wherein the light receiver elements are arranged in a fixed geometric pattern;
   wherein the emitter side and the receiver side are separated by a predetermined distance; and
   wherein to each of the plurality of second light receiver elements a plurality of dedicated light emitter elements among the plurality of first light emitter elements is assigned, the assigned light emitter elements forming an array, wherein the dedicated light emitter elements are implemented to contemporaneously emit light to be received by the respective light receiver element.

10. The light curtain arrangement of claim 9, wherein the number of light receiver elements is less than the number of light emitter elements.

11. The light curtain arrangement of claim 9, wherein the light emitter elements and/or the light receiver elements are arranged along a line.

12. The light curtain arrangement of claim 9, wherein the light emitter elements are implemented to emit light in a same principal direction from the emitter side of the safety area towards the receiver side of the safety area.

13. The light curtain arrangement of claim 9, wherein an array comprises a predetermined number N of dedicated light emitter elements assigned to a respective one light receiver element, said assigned light emitter elements being the N light emitter elements that are located geometrically closest to the respective one light receiver element.

14. The light curtain arrangement of claim 9, wherein the light emitter elements of a respective one array are arranged next to each other.

15. The light curtain arrangement of claim 9, wherein all light emitter elements have the same nominal luminous power.

16. The light curtain arrangement of claim 9, wherein the light curtain arrangement is implemented to operate in a first operation mode to detect an object in a safety area extending along a first predetermined distance, and to operate in a second operation mode to detect an object in a safety area extending along a second predetermined distance, the first predetermined distance being larger than the second predetermined distance, wherein the first operation mode includes, for each light receiver element, contemporaneously emitting light from the dedicated light emitter elements assigned to a respective one light receiver element towards the respective one light receiver element; and wherein the second operation mode includes, for each light receiver element, emitting light from one selected light emitter element to a respective one light receiver element, wherein the one selected light emitter element is the light emitter element that is located geometrically closest to the respective one light receiver element.

17. The light curtain arrangement of claim 16, further comprising a configuration device for setting the operation mode, wherein the configuration device includes at least one of the group of: a dip switch device, a configuration memory device, and a programming interface.

18. The light curtain arrangement of claim 17, wherein a number of light emitter elements assigned to each light receiver element is set by the configuration device.

19. The light curtain arrangement of claim 16, wherein in the second operation mode, a supply current value for the light emitter elements is reduced with respect to the first operation mode.

20. The light curtain arrangement of claim 9, further comprising a control device implemented to activate and deactivate the light emitter elements and the light receiver elements.

* * * * *